United States Patent [19]
Charbonneau et al.

[11] Patent Number: 5,171,823
[45] Date of Patent: Dec. 15, 1992

[54] MELT PROCESSABLE THERMOTROPIC WHOLLY AROMATIC POLYESTER CONTAINING 6-HYDROXY-2-NAPHTHOIC ACID MOIETIES

[75] Inventors: Larry F. Charbonneau, Mendham; Gordon W. Calundann, North Plainfield, both of N.J.

[73] Assignee: Hoechst Celanese Corp., Somerville, N.J.

[21] Appl. No.: 814,340

[22] Filed: Dec. 27, 1991

[51] Int. Cl.$^5$ .................. C08G 63/18; C08G 63/00; C08G 63/02
[52] U.S. Cl. .................................. 528/193; 528/176; 528/190; 528/194; 528/219; 528/271; 528/272
[58] Field of Search ............... 528/176, 190, 193, 194, 528/219, 271, 272

[56] References Cited
FOREIGN PATENT DOCUMENTS
01-016823 1/1989 Japan .

OTHER PUBLICATIONS
CA 111 (12): 97990u, Sugimoto et al., "*Chemistry of Synthetic High Polymers*" AB.

*Primary Examiner*—John Kight, III
*Assistant Examiner*—T. Mosley
*Attorney, Agent, or Firm*—Joseph M. Mazzarese

[57] ABSTRACT

The present invention discloses a wholly aromatic, melt processable polyester which is comprised of recurring moieties derived from the following compounds: 2,6-naphthalenedicarboxylic acid, 4-hydroxybenzoic acid, an aromatic dihydroxy compound, and 6-hydroxy-2-naphthoic acid. The resulting wholly aromatic polyester is capable of forming a thermotropic melt phase at temperatures below approximately 350° C. and most preferably at temperatures below approximately 290° C.

11 Claims, No Drawings

MELT PROCESSABLE THERMOTROPIC WHOLLY AROMATIC POLYESTER CONTAINING 6-HYDROXY-2-NAPHTHOIC ACID MOIETIES

BACKGROUND OF THE INVENTION

The present invention relates to the synthesis of wholly aromatic polyesters and particularly to improvements in the processibility of a polymer derived from 4-hydroxybenzoic acid, 2,6-naphthalenedicarboxylic acid, and hydroquinone by incorporation of or less than 25 mole % of a moiety derived from 6-hydroxy-2-naphthoic acid.

Wholly aromatic polyesters are well known in the art and are widely employed in molding applications for the production of engineering plastics. The term "wholly" indicates that each monomer moiety present contributes at least one aromatic ring to the polymer backbone. Although commercially successful, wholly aromatic polyesters tend to be difficult to melt process using conventional melt processing procedures. This is particularly true when such materials are processed by injection molding or melt spinning. The processing difficulties arise from the somewhat intractable nature of such polymers and their relatively high melting points.

U.S. Pat. No. 4,067,852 discloses a wholly aromatic polyester preferably derived from 60 mole % 4-hydroxybenzoic acid, 20 mole % 2, 6-naphthalenedicarboxylic acid, and 20 mole % of hydroquinone. The resulting polymer is reported to possess a liquid crystalline molten state at a temperature of below approximately 330° C.

U.S. Pat. No. 4,083,829 discloses an aromatic polyester consisting of recurring moieties derived from 4-hydroxybenzoic acid, 2,6-naphthalenedicarboxylic acid, and hydroquinone by the addition of meta-linked monomers or side chain groups such as isophthalic acid and resorcinol. The polyester is reported as being not intractable and may be melt extruded at temperatures below approximately 300° C. and preferably below approximately 280° C. However, use of meta-linked and side-chain groups may cause intrachain motions that result in poor physical properties at temperatures above which intrachain motions occur because the linearity of the polymer is disrupted and becomes more amorphous.

Further means of improving the processability of the wholly aromatic polyester of the '852 patent is by incorporation of meta-oxybenzoyl moieties (U.S. Pat. No. 4,130,545) or addition of methyl hydroquinone (U.S. Pat. No. 4,337,191). Both of these patents report a melting temperature reduction for preferred embodiments in the vicinity of approximately 300° C.

U.S. Pat. No. 5,025,082 issued to Kishiro, et al. discloses a wholly aromatic polyester and aromatic polyester amide directed toward having melting points low enough for use in conventional polyester producing apparatuses, but not so low that the polymer becomes amorphous. Specifically, this reference cites an aromatic polyester comprised of moieties from 2,6-naphthalenedicarboxylic acid, 4,4'-dihydroxy-diphenyl, an aromatic diol, and p-hydroxybenzoic acid. This composition is reported as possessing a liquid crystalline molten state at a temperature of 320° C. or lower.

SUMMARY OF THE INVENTION

The present invention discloses a melt processable wholly aromatic polyester capable of forming a thermotropic melt phase at temperatures below approximately 350° C. and most preferably below approximately 290°, comprises of the recurring moieties:

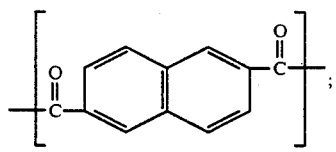  (I)

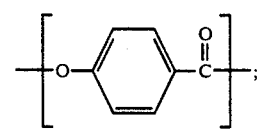  (II)

$+O-Ar-O+$; and  (III)

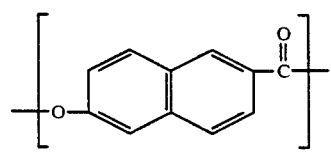  (IV)

where Ar of moiety III is a divalent radical comprising one or more fused or separate aromatic rings.

DETAILED DESCRIPTION OF THE PREFERRED EMBODIMENTS

The wholly aromatic polyester of the present invention includes at least four recurring moieties. Moiety I is derived from 2,6-naphthalenedicarboxylic acid and is represented by the structural formula:

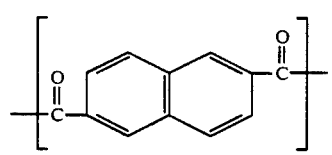  (I)

In preferred embodiments, Moiety I comprises approximately 15 to 30 mole % of the wholly aromatic polyester, and most preferably about 15 mole %.

Moiety II is derived from 4-hydroxybenzoic acid and is represented by the following structural formula:

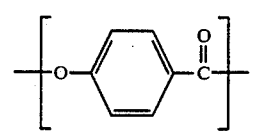  (II)

Preferably, Moiety II comprises 15 to 60 mole % of the wholly aromatic polyester and most preferably about 60 mole %.

Moiety III is a dioxy aryl moiety of the formula:

$+O-Ar-O+$  (III)

where Ar is a radical comprising one or more fused or separate aromatic rings. Preferred moieties of this type include:

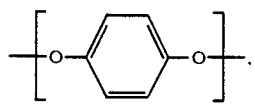

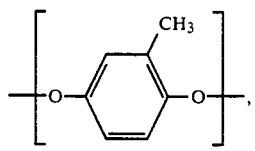

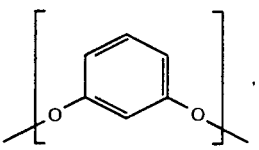

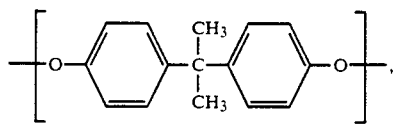

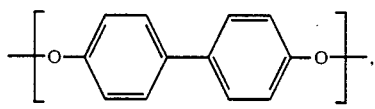

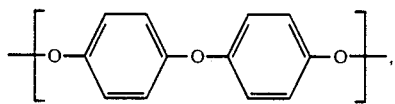

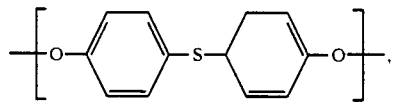

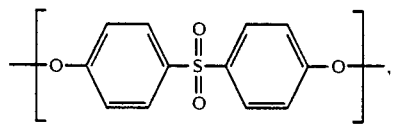

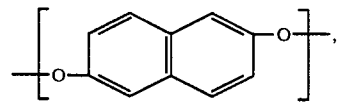

and mixtures thereof. The form most preferred for Moiety III is the hydroquinone moiety comprising approximately 15 to 30 mole % of the wholly aromatic polyester most preferably about 15 mole %.

Moiety IV is derived from 6-hydroxy-2-naphthoic acid represented by the structural formula:

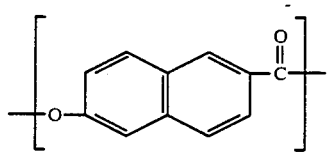

(IV)

In preferred embodiments, Moiety IV comprises approximately 5 to 25 mole % of the wholly aromatic polyester and most preferably about 10 mole %.

The wholly aromatic polyesters of the present invention derived from the foregoing recurring moieties have been found to form a thermotropic melt phase at a temperature below approximately 350° C., and preferably below approximately 290° C. Melting temperatures reported herein are with reference to melting temperatures exhibited by the unannealed polyester unless otherwise specified. It should be noted that the melting temperature initially exhibited by the wholly aromatic polymer when it is melted for the first time following its formation may be slightly elevated above the relatively stable or constant temperatures at which it melts upon subsequent heatings of the solid polymer. Such stable melting temperatures may be confirmed by a differential scanning calorimeter using repeat scans at a 20° C. per minute heat-up rate. The wholly aromatic polyester contains moieties which are free of ring substitution other than the linking bonds which form the main, rigid polymer chain. The rigid, crystalline nature of this aromatic polyester permits it to readily align and therefore exhibit ordered anisotropic properties in the melt phase. Such properties ease melt processing when using conventional melt processing techniques.

Other ester-forming moieties (e.g. dicarboxy or dioxy units) other than those previously discussed which are free of ring substitution may be included in the wholly aromatic polyester of the present invention in minor concentrations provided that such moieties do not adversely influence the desired thermotropic melt phase exhibited by the polyester as defined in the present disclosure. As will be apparent to those skilled in the art, the total molar quantities of dicarboxy units and dioxy units present within the wholly aromatic polyester will be substantially equal. Also, polymerization will cause the various moieties to be present in a random configuration.

The wholly aromatic polyesters of the present invention commonly have end groups of the formula:

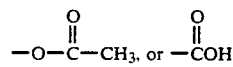

depending upon the synthesis route selected. The end groups optionally may be capped, e.g., acidic end groups may be capped with a variety of alcohols, and hydroxyl end groups may be capped with a variety of organic acids. Thus, end capping units such as phenylester

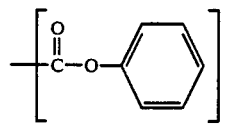

and methylester

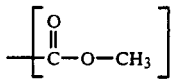

may be included. If desired, the polymer may be oxidatively crosslinked to at least some degree by heating in an oxygen-containing atmosphere (e.g. in air) while still in bulk form or as a previously shaped article at a temperature below its melting point for a limited period of time (e.g., for a few minutes).

The wholly aromatic polyesters of the present invention tend to be substantially insoluble in common polyester solvents and as such are not susceptable to solution processing. However, these polyesters are readily processed by common melt processing techniques and particularly are suited for melt extrusion to form fibers. Most compositions are soluble to a small degree in pentafluorophenol and pentafluorophenol-hexafluoroisopropanol mixtures.

The wholly aromatic polyesters of the present invention commonly exhibit an average molecular weight of about 2,000 to 200,000, and preferably about 10,000 to 100,000, and most preferably about 40,000 to 50,000. Molecular weight may be determined by standard techniques which do not involve solutioning the polymer, e.g., by end group determination via infrared spectroscopy on compressed molded film or by testing a solution of the polymer in pentafluorophenol via light scattering techniques, etc.

Prior to heat treating, the wholly aromatic polyester of the present invention commonly exhibits an inherent viscosity (I.V.) of approximately 4 to 10 dl/gm, preferably 6.5 to 9.5 dl/gm, and most preferably 7 to 8 dl/gm when measured in a 1:1 solution of hexafluoroisopropanol and pentafluorophenol at 60° C., and exhibits a melt viscosity in the range of approximately 120 to 900 (preferably 150 to 800) poise in the 350° C. range and at a shear rate of 1,000 sec$^{-1}$ (as measured using a commercially available capillary rheometer).

The wholly aromatic polyester of this invention can be considered crystalline in the sense that fibers melt extruded therefrom exhibit X-ray diffraction patterns characteristic of polymeric crystalline materials when using Ni filtered CuK alpha-radiation and flat plate cameras. Despite the crystallinity observed, the polymer of the present invention may be easily melt processed.

The wholly aromatic polyester of the present invention is not intractable and forms a relatively low viscosity anistropic melt phase having an atypical degree of order. The polyester chains tend to orient in the shear direction when extruded.

These anisotropic properties occur at a temperature which is readily amenable for melt processing to form shaped articles, and may be confirmed by conventional polarized light techniques wherein crossed-polarizers are utilized. More specifically, the anisotropic melt phase may be conveniently confirmed by the use of a Leitz polarizing microscope at a magnification of 40× with the sample on a Kofler hot stage and under a nitrogen atmosphere. The polymer melt is optically anisotropic as it transmits light when examined between cross polarizers. The amount of light transmitted increased as the sample is sheared (i.e. made to flow) and is also optically anisotropic even in the static state.

The wholly aromatic polyesters of this invention may be formed by a variety of ester-forming techniques known in the art. The functional groups of the organic monomer compounds may be carboxylic acid groups, hydroxyl groups, ester groups, acid halides, etc. For instance, the organic monomer compounds may be reacted in the absence of a heat exchange fluid via a melt acidolysis procedure. They accordingly may be heated in a melt phase condensation procedure wherein the naphthalene dicarboxylic acid at least initially is present as a solid with the temperature being progressively raised and with the reaction continuing via a melt condensation procedure. A vacuum may be applied in the later stages of the process to facilitate removal of volatiles formed during the condensation (e.g. acetic acid). Also, a slurry system may be utilized initially with the reaction being completed in the melt.

Commonly assigned U.S. Pat. No. 4,083,829 entitled "Melt Processable Thermotropic Wholly Aromatic Polyester" describes a slurry polymerization process which may be employed to form the polyester of the present invention wherein the solid product is suspended in a heat exchange medium. The disclosure of this patent is herein incorporated by reference.

When using either the melt acidolysis procedure or the slurry polymerization technique, the organic monomer reactants from which the 4-oxybenzoyl moiety (Moiety II), the dioxy aryl moiety (Moiety III), and the 6-oxy-2-naphthoyl moiety (Moiety IV) are derived are initially provided in a modified form whereby the usual hydroxyl groups of these monomers are esterified (i.e., they are provided as acyl esters). For instance, lower acyl esters of 4-hydroxybenzoic acid wherein the hydroxy group is esterified and lower acyl diesters of an aryl diol may be provided as reactants. The lower acyl groups preferably have from 2 to about 4 carbon atoms. Preferably the acetate esters of the organic compounds which form moieties II, III, and IV are provided. Accordingly, particularly preferred reactants for condensation with 2,6-naphthalenedicarboxylic acid are p-acetoxybenzoic acid, 6-acetoxy-2-naphthoic acid and aryl diacetate. If minor quantities of other reactants which provide oxy-units within the resulting polymer optionally are provided, these too are preferably provided as the corresponding lower acyl ester.

Relative quantities of organic monomer reactants are provided in the reaction zone so that the potential dicarboxy units and dioxy units available for incorporation in the resulting wholly aromatic polyester are substantially equal.

Typical catalysts which optionally may be used in either the melt acidolysis procedure or in the slurry polymerization procedure of U.S. Pat. No 4,067,852 include alkyl tin acids, acyl esters of tin, titanium dioxide, alkoxy titanium silicates, titanium alkoxides, alkali and alkaline earth metal salts of carboxylic acids (e.g., sodium acetate), the gaseous acid catalysts such as Lewis acids (e.g., BF3), hydrogen halides (e.g., HCl), etc. The quantity of catalyst utilized typically is about 0.001 to 1 percent by weight based upon the total monomer weight, and most commonly about 0.01 to 0.2 percent by weight.

The inherent viscosity of a previously formed polyester may be further increased using a solid state polymerization procedure wherein the particulate polymer is heated in an inert atmosphere such as in a nitrogen atmosphere at about 260° C. for 1 to 12 hours.

After the polymerization reaction, the solid particulate of the wholly aromatic polyester is recovered by any convenient technique. For instance, the solid particulate polymer may be separated from the inert heat exchange medium (preferably following cooling), by decantation, centrifugation, or filtration. It is then washed and dried. During the washing, residual heat exchange medium adhering to the product may be removed by acetone, alcohols, low hydrocarbons, methylene chloride, chloroform, benzene, toluene, etc., or by any other relatively volatile solvent in which the heat exchange medium is soluble.

The present invention's wholly aromatic polyester readily can be melt processed to form a variety of articles, e.g., molded three dimensional articles, fibers, or films. This polyester may be molded via standard injection molding techniques commonly utilized when forming molded articles. It is not essential that more severe molding conditions (e.g., higher temperature, compression molding, impact molding, or plasma spraying techniques) be utilized. Fibers and films readily may be extruded by commonly available melt processing techniques.

The polyester of the present invention may be used to form a molding compound which incorporates approximately 1 to 60 percent by weight of a solid filler such as talc and/or a reinforcing agent such as glass fibers.

Unfilled molded samples of the polyester of the present invention exhibit an attractive balance between their melting points and heat deflection temperatures with the heat deflection temperature always being no more than 80° C. lower than its corresponding melting point and preferably no more than 60° C. lower than its corresponding melting point. The heat deflection temperatures of a molded article may be determined in accordance with the procedure of ASTM D648 wherein the deflection temperature under load at 264 psi is determined.

The present polymer also exhibits excellent mechanical properties for molded samples. These mechanical properties vary with the melting point, (i.e. higher strength and modulus properties and greater Notched Izod Strength achieved with correspondingly higher melting points). For melting points ranging from 283° to 345° C., tensile strength ranged from 19,000 to 28,200 psi, tensile percent elongation from 2.13 to 1.70%, tensile modulus from 1,630,000 to 2,250,000 psi. Flexural strength varied from 20,400 to 30,100 psi and flexural modulus from 1,290,000 to 1,720,000 psi. The Notched Izod Strength ranged from 4.52 to 7.93 ft-lbs/in.

The foregoing mechanical properties for the molded samples were determined in accordance with the following procedures: tensile strength, tensile modulus, tensile percent elongation by ASTM D638; flexural strength and modulus by ASTM D790; and Notch Izod Strength by ASTM D256.

An additional use for the wholly aromatic polyester of the present invention may be as a coating material which may be applied as a powder or as a liquid dispersion.

When fibers and films are formed, the extrusion orifice may be selected from among those typically used for melt extrusion of such shaped articles. For instance, the extrusion orifice may be in the form of a rectangular die slit when forming a polymeric film. A spinneret containing one or a plurality of extrusion orifices may be employed when forming filamentary material. For example, a standard conical spinneret having 1 to 2000 holes (e.g., 6 to 1500 holes) and a diameter of about 1 to 60 mils, such as commonly used for melt spinning poly(ethylene terephthalate), may be utilized. Yarns of about 20 to 200 continuous filaments are commonly formed. The melt-spinnable polyester is supplied to the extrusion orifice at a temperature above its melting point, e.g., a temperature of about 300° to 350° C. depending on the particular embodiment.

After extrusion through the shaped orifice the resulting filamentary material or film is passed in the direction of its length through a solidification or quench zone wherein the molten filamentary material or film is transformed to a solid filamentary material or film. The resulting fibers typically have a denier per filament of about 2 to 8 and preferably a denier per filament of about 4 to 6.

Subsequent thermal treatment of the extruded filamentary material or film may be performed to further enhance the physical properties of such materials. Fiber tenacity or film strength commonly is increased by such thermal treatment. In particular, the films or fibers may be thermally treated in an inert atmosphere (e.g., nitrogen, argon, helium) with or without stress at a temperature below the polymer melting point until the desired property enhancement is achieved. Thermal treatment may range from a few minutes to several days. As the fiber is thermally treated, its melting temperature is progressively raised. The inert atmosphere temperature may be raised in stages or continuously during thermal treatment or held at a constant level. For instance, the fiber gradually may be heated in flowing nitrogen to 270° C., 300° C., or 320° C. and maintained at such temperatures for approximately 2 to 16 hours, most preferably 8 hours. Optimum heat treatment conditions will vary with the specific composition of the aromatic polyester and with the fiber's processing history. Coalescence between adjoining filaments during heat treatment may be minimized by applying a finely divided particulate solid (e.g., talc, silica, or mixtures thereof) to the fiber bundle prior to such treatment.

The as-spun fibers formed from the polyester of the present invention are highly oriented and exhibit physical properties which render them suitable for use in high performance applications. As-spun fibers commonly exhibit an average single filament tenacity of at least 6 grams per denier (e.g., about 6 to 10 grams per denier), and an average single filament tensile modulus of at least about 400 grams per denier (e.g., about 400 to 600 grams per denier). Following the thermal treatment previously described, the fibers often exhibit a substantially enhanced average single filament tenacity of at least 15 grams per denier (e.g., 15 to 30 grams per denier), and an average single filament tensile modulus of at least 400 grams per denier measured at ambient conditions (e.g. 72° F., 65% relative humidity). Such properties enable the fibers to be used with particular advantage in demanding industrial applications such as conveyor belts, hoses, cabling, resin reinforcement, etc. Films formed of the present invention may be used as strapping tape, cable wrap, magnetic tape, electric motor dielectric film, etc. The fibers and films exhibit an inherent resistance to burning.

The foregoing filament properties of tensile strength, elongation, and tensile modulus were determined in accordance with the procedure of ASTM D3822.

The following examples are presented as specific illustrations of the claimed invention. Examples I and II are given to comparatively illustrate the improvements made over the polymer of the '852 patent through the addition of up to 10 mole % of 6-hydroxy-2-naphthoic acid (Moiety IV). Comparative tables of some key physical properties are given at the end of Example II. Example III is included to provide an illustration of polymeric properties that are achieveable at 25 mole % concentration of the 6-hydroxy-2-naphthoyl moiety.

However, it should be understood that the invention is not limited to the embodiments illustrated herein.

EXAMPLE I

To a two liter, three-neck, round bottom flask equipped with Vigreaux column and condenser, nitrogen inlet, thermocouple, and stainless steel "C" stirrer were charged the following:
a) 497.3 grams 4-hydroxybenzoic acid (3.6 moles)
b) 112.9 grams 6-hydroxy-2-naphthoic acid (0.6 moles)
c) 194.6 grams 2,6-naphthalenedicarboxylic acid (0.9 moles)
d) 99.1 grams hydroquinone (0.9 moles)
e) 0.12 gram potassium acetate catalyst The system was de-aerated with three vacuum-nitrogen purge cycles before the addition of acetic anhydride (2.5% molar excess). The flask was then heated in a fluidized sand bath while purging with nitrogen. The system was heated to 125° C. over 50 minutes, to 140° C. over 40 minutes, to 150° C. over 20 minutes, to 200° C. over 45 minutes, to 210° C. over 5 minutes, to 220° C. over 6 minutes, to 275° C. over 50 minutes, to 310° C. over 70 minutes and to 330° C. over 50 minutes. The system was slowly evacuated (in 100 mbar increments). The reading of the torque indicator was noted at the beginning of this vacuum period. Under vacuum at 330° C., the viscosity of the polymer increased as reflected by the reading on the torque indicator. When the increase in torque reached a peredetermined level (delta torque, 40 mv) the vacuum was released and nitrogen was purged into the system. The system was taken down and the polymer was allowed to cool. The polymer plug was removed by breaking the flask, cut into pieces and then ground into small particles.

The resulting polymer consisted of 60 mole % of the 4-oxy-benzoyl moiety (Moiety II), 10 mole % of the 6-oxy-2-naphthoyl moiety (Moiety IV), 15 mole % of the 2,6-naphthalenedicarboxyloyl moiety (Moiety I), and 15 mole % of the dioxy aryl moiety (Moiety III).

The polymer had an inherent viscosity of 5.1 dl/g when measured in 1:1 HFIP-PFP and a melting temperature of 289° C. measured by a differential scanning calorimeter using repeat scans at a 20° C. per minute heat-up rate.

The temperature of crystallation (T$_c$) of the polymer obtained upon cooling the melt at 20° C./min was 241.7° C. The melt viscosity of the polymer was approximately 169 poise at 350° C. and a shear rate of 1,000 sec.$^{-1}$ as measured in a Kayeness capillary rheometer having a capillary die measuring 0.03 inch diameter and 1 inch in length.

The mechanical properties for an injection-molded sample of the polymer were measured at a molding temperature of 330° C. and are summarized below:

| | |
|---|---|
| Tensile Strength: | 19,800 psi |
| Tensile Modulus: | 1,630,000 psi |
| Tensile Elongation: | 2.13% |
| Flexural Strength: | 20,400 psi |
| Flexural Modulus: | 1,290,000 psi |
| Notched Izod Strength: | 4.52 ft-lb/in |
| Heat Deflection Temp: (@ 264 psi) | 222° C. |

Melt extruded fibers were spun at a temperature of 300° C., a melt pressure of 700 psi, and a maximum take up speed of 900 meters per minute. Subsequent heat treatment occured in a nitrogen stream for 16 hours at a temperature of 270° C. Average single-filament properties for the as-spun and heat-treated filaments are summarized below:

| | As Spun | Heat-Treated |
|---|---|---|
| Tenacity (grams/denier): | 8.7 | 24.1 |
| Tensile Modulus (grams/denier): | 576 | 472 |
| Elongation (percent): | 1.9 | 4.8 |

EXAMPLE II

Using the same procedure and apparatus as Example I, the following ingredients were charged to the flask:
a) 526.1 grams 4-hydroxybenzoic acid (3.8 moles)
b) 59.7 grams 6-hydroxy-2-naphthoic acid (0.32 moles)
c) 240.2 grams 2,6-naphthalenedicarboxylic acid (1.1 moles)
d) 124.1 grams hydroquinone (1.1 moles)
e) 0.12 gram potassium acetate catalyst The resulting polymer consisted of 60 mole % of the 4-oxy-benzoyl moiety (Moiety II), 5 mole % of the 6-oxy-2-naphthoyl moiety (Moiety IV), 17.5 mole % of the 2,6-naphthalenedicarboxyloyl moiety (Moiety I), and 17.5 mole % of the dioxy aryl moiety (Moiety III).

The polymer had an inherent viscosity of 5.6 dl/g when measured in 1:1 HFIP-PFP and a melting temperature of 308° C. measured by a differential scanning calorimeter using repeat scans at a 20° C. per minute heat-up rate.

The temperature of crystallation (T$_c$) of the polymer obtained upon cooling the melt at 20° C./min was 262° C. The melt viscosity of the polymer was approximately 122 poise at 355° C. and a shear rate of 1,000 sec.$^{-1}$ as measured in a Kayeness capillary rheometer having a capillary die measuring 0.03 inch diameter and 1 inch in length.

The mechanical properties for an injection-molded sample of the polymer were measured from specimens obtained at a molding temperature of 320° C. and are summarized below:

| | |
|---|---|
| Tensile Strength: | 27,800 psi |
| Tensile Modulus: | 1,810,000 psi |
| Tensile Elongation: | 2.43% |
| Flexural Strength: | 22,160 psi |
| Flexural Modulus: | 1,220,000 psi |
| Notched Izod Strength: | N/A ft-lb/in |
| Heat Deflection Temp: (@ 264 psi) | 252° C. |

Melt extruded fibers were spun at a temperature of 345° C., a melt pressure of 240 psi, and a maximum take up speed of 2,000 meters per minute. Subsequent heat treatment occured in a nitrogen stream for 8 hours and at a temperature of 300° C. Average single-filament properties for the as-spun and heat-treated filaments are summarized below:

| | As Spun | Heat-Treated |
|---|---|---|
| Tenacity (grams/denier): | 8.4 | 18.6 |
| Tensile Modulus (grams/denier): | 475 | 455 |
| Elongation (percent): | 2.1 | 3.9 |

COMPARATIVE EXAMPLES

Following the procedure taught in U.S. Pat. No. 4,067,852, a polymer of 60 mole % of 4-oxy-benoyl (Moiety II), 20 mole % of 2,6-naphthalenedicarboxyloyl moiety (Moiety I) and 20 mole % hydroquinone (Moiety III) was prepared. The following tables compare key as-spun fiber properties and molded sample properties of Examples I and II with the comparable physical properties of the '852 polymer. From the first table the effect of adding 5 mole % and 10 mole % of the 6-oxy-2-naphthoyl moiety (Moiety IV) is clearly visible in that improved as-spun fiber tenacity properties are achieved at processing temperatures.

The second table compares the corresponding effects on molded sample properties. Example I and II are shown to have lower heat deflection temperatures ("HDT") as compared to the '852 polymer for comparable strength measurements.

| MECHANICAL FIBER PROPERTIES | | | |
| --- | --- | --- | --- |
| SAMPLE | II:IV:I:III MOIETY MOLE RATIO | SPIN TEMP. (°C.) | AS-SPUN TENACITY (g/d) |
| '852 Patent | 60:0:20:20 | 359 | 7.2 |
| Example I | 60:10:15:15 | 300 | 8.7 |
| Example II | 60:5:17.5:17.5 | 345 | 8.4 |

| MECHANICAL MOLDED PROPERTIES | | | |
| --- | --- | --- | --- |
| SAMPLE | II:IV:I:III MOIETY MOLE RATIO | STRENGTH (KPSI) | HDT (MEA. @ 264 PSI) |
| '852 Patent | 60:0:20:20 | 27.3 | 293 |
| Example I | 60:10:15:15 | 19.8 | 222 |
| Example II | 60:5:17.5:17.5 | 27.8 | 252 |

EXAMPLE III

Using the same procedure and apparatus as Example I, the following ingredients were charged to the flask:
a) 118.6 grams 4-hydroxybenzoic acid (0.86 moles)
b) 269.4 grams 6-hydroxy-2-naphthoic acid (1.4 moles)
c) 371.3 grams 2,6-naphthalenedicarboxylic acid (1.7 moles)
d) 209.7 grams hydroquinone (1.9 moles)
e) 0.12 gram potassium acetate catalyst The resulting polymer consisted of 15 mole % of the 4-oxy-benzoyl moiety (Moiety II), 25 mole % of the 6-oxy-2-naphthoyl moiety (Moiety IV), 30 mole % of the 2,6-naphthalenedicarboxyloyl moiety (Moiety I), and 30 mole % of the dioxy aryl moiety (Moiety III). (Note that an excess of hydroquinone was added in the above example to allow for sublimation during the reaction).

The polymer had an inherent viscosity of 6.18 dl/g when measured in 1:1 HFIP-PFP and a melting temperature of 345° C. measured by a differential scanning calorimeter using repeat scans at a 20° C. per minute heat-up rate.

The melt viscosity of the polymer was approximately 884 poise at 350° C. and a shear rate of 1,000 sec.$^{-1}$ as measured in a Kayeness capillary rheometer having a capillary die measuring 0.03 inch diameter and 1 inch in length.

The mechanical properties for an injection-molded sample of the polymer were measured at a molding temperature of 350° C. and are summarized below:

| | |
| --- | --- |
| Tensile Strength: | 28,200 psi |
| Tensile Modulus: | 2,250,000 psi |
| Tensile Elongation: | 1.7% |
| Flexural Strength: | 30,100 psi |
| Flexural Modulus: | 1,720,000 psi |
| Notched Izod Strength: | 7.93 ft-lb/in |
| Heat Deflection Temp: (@ 264 psi) | 300° C. |

Melt extruded fibers were spun at a temperature of 390° C., a melt pressure of 190 psi, and a maximum take up speed of 801 meters per minute. Subsequent heat treatment occured in a nitrogen stream for 16 hours and at a temperature of 320° C. Average single-filament properties for the as-spun and heat-treated filaments are summarized below:

| | As Spun | Heat-Treated |
| --- | --- | --- |
| Tenacity (grams/denier): | 8.2 | 23.5 |
| Tensile Modulus (grams/denier): | 460 | 506 |
| Elongation (percent) | 2.4 | 4.4 |

Although this invention has been described with preferred embodiments, it is to be understood that variations and modifications may be employed without departing from the concept and scope of the invention as defined in the following claims.

What is claimed is:

1. A wholly aromatic polyester which comprises:
   (a) a 2,6-naphthalenedicarboxylic acid moiety represented by the structural formula I:

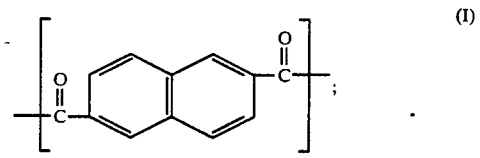

(b) a 4-hydroxybenzoic acid moiety represented by the structural formula II:

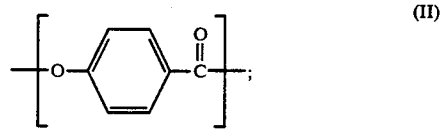

(c) a hydroquinone moiety of the structural formula (III):

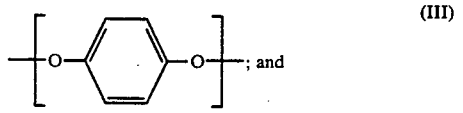

(d) a 6-hydroxy-2-naphthoic acid moiety represented by the structural formula:

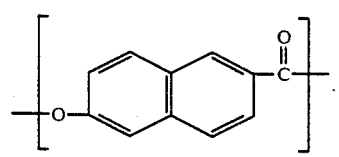

(IV)

2. A wholly aromatic polyester which consists essentially of:
(a) a 2,6-naphthalenedicarboxylic acid moiety represented by the structural formula I:

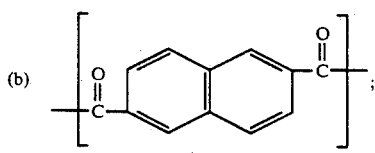

(I)

(b) a 4-hydroxybenzoic acid moiety represented by the structural formula II:

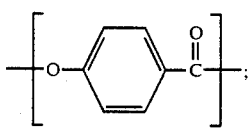

(II)

(c) a hydroquinone moiety of the structural formula (III):

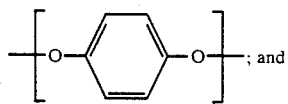

(III)

(d) a 6-hydroxy-2-naphthoic acid moiety represented by the structural formula:

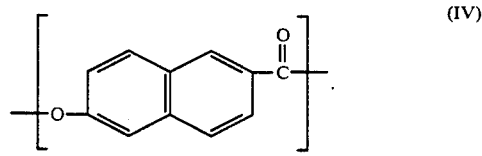

(IV)

3. The wholly aromatic polyester of claim 1 comprising approximately 15 to 30 mole % of moiety I, approximately 15 to 60 mole % of moiety II, approximately 15 to 30 mole % of moiety III, and approximately 5 to 25 Mole % of moiety IV.

4. The wholly aromatic polyester of claim 1 which consists essentially of approximately 15 mole % of moiety I, approximately 60 mole % of moiety II, approximately 15 mole % of moiety III, and approximately 10 mole % of moiety IV.

5. The wholly aromatic polyester of claim 1 which is capable of forming a thermotropic melt phase at temperatures below approximately 350° C.

6. The wholly aromatic polyester of claim 1 which is capable of forming a thermotropic melt phase at temperatures below approximately 290° C.

7. The wholly aromatic polyester of claim 1 which is capable of forming a thermotropic melt phase at temperatures below approximately 320° C.

8. A molding composition comprised of the wholly aromatic polyester of claim 1 and approximately 1 to 60 percent by weight of a solid material selected from the group consisting of filler, reinforcing agent, and a mixture of filler and reinforcing agent.

9. A fiber which has been melt spun from the polyester of claim 1.

10. A film which has been melt extruded from the polyester of claim 1.

11. A molded article comprisingg the melt-processable polyester of claim 1.

* * * * *